United States Patent
Kim et al.

(10) Patent No.: US 8,134,945 B2
(45) Date of Patent: Mar. 13, 2012

(54) APPARATUS AND METHOD FOR INCREASING CELL CAPACITY THROUGH OPTIONAL SIGNAL COMBINING BETWEEN RELAY STATIONS IN A CELLULAR SYSTEM USING WIRED RELAY STATIONS

(75) Inventors: Byung-Jik Kim, Seongnam-si (KR); Seong-Taek Hwang, Pyeongtaek-si (KR); Won-Jin Sung, Seoul (KR); Jin-Woo Choe, Seoul (KR); Jong-Hyun Park, Seoul (KR); Jong-Hyun Kim, Seoul (KR)

(73) Assignees: Samsung Electronics Co., Ltd., Maetan-Dong, Yeongtong-Gu, Suwon-Si, Gyeonggi-Do (KR); Industry-University Cooperation Foundation Sogang University, Sinsu-Dong, Mapo-Gu, Seoul (KR)

( * ) Notice: Subject to any disclaimer, the term of this patent is extended or adjusted under 35 U.S.C. 154(b) by 1109 days.

(21) Appl. No.: 11/965,804

(22) Filed: Dec. 28, 2007

(65) Prior Publication Data
US 2008/0198906 A1     Aug. 21, 2008

(30) Foreign Application Priority Data
Feb. 16, 2007 (KR) .................. 10-2007-0016814

(51) Int. Cl.
| H04B 7/00 | (2006.01) |
| H04B 7/14 | (2006.01) |
| H04B 7/185 | (2006.01) |
| H04B 1/00 | (2006.01) |
| H04B 17/00 | (2006.01) |
| H04B 15/00 | (2006.01) |
| H04W 4/00 | (2009.01) |
| H03C 1/62 | (2006.01) |

(52) U.S. Cl. ........ 370/315; 370/310; 370/317; 370/328; 370/329; 370/341; 455/513; 455/522; 455/63.1; 455/67.13; 455/115.3

(58) Field of Classification Search .................. 370/315
See application file for complete search history.

(56) References Cited

U.S. PATENT DOCUMENTS
5,946,621 A * 8/1999 Chheda et al. ............... 455/440
(Continued)

FOREIGN PATENT DOCUMENTS
| JP | 2005-142676 | 6/2005 |
| JP | 2006-246002 | 9/2006 |
| KR | 2006-96510 | 9/2006 |

(Continued)

Primary Examiner — Ian N Moore
Assistant Examiner — Jenee Alexander
(74) Attorney, Agent, or Firm — Cha & Reiter, LLC

(57) ABSTRACT

A method, apparatus and system for increasing cell capacity through optional signal combining between Relay Stations (RSs) in a cellular system using wired RSs is disclosed. The method includes receiving, by a Base Station (BS), an average Carrier-to-Interference ratio (C/I) value of transmission signals from Mobile Stations (MSs) located inside each coverage area, being fed back from the RSs or the MSs in its corresponding cell; classifying the MSs into two groups according to the C/I value; performing resource allocation satisfying a minimum data rate from a corresponding RS, for MSs belonging to a group having a C/I value greater than a preset threshold Γ among the classified groups; performing resource allocation by applying an optional signal combining scheme taking into account two RSs having a highest C/I value, for MSs belonging to a group having a C/I value below the threshold among the classified groups; and allocating all unallocated subchannels of each individual RS in an order of an MS having a high C/I value among MSs of a corresponding RS until there is no more unallocated subchannel of each RS.

19 Claims, 7 Drawing Sheets

U.S. PATENT DOCUMENTS

| | | | |
|---|---|---|---|
| 2003/0002450 A1* | 1/2003 | Jalali et al. | 370/342 |
| 2003/0050071 A1* | 3/2003 | Shurvinton | 370/329 |
| 2006/0285505 A1* | 12/2006 | Cho et al. | 370/332 |
| 2008/0031197 A1* | 2/2008 | Wang et al. | 370/329 |

FOREIGN PATENT DOCUMENTS

| | | |
|---|---|---|
| KR | 2006-124401 | 12/2006 |
| KR | 2006-129807 | 12/2006 |
| KR | 2007-4370 | 1/2007 |

* cited by examiner

US 8,134,945 B2

APPARATUS AND METHOD FOR INCREASING CELL CAPACITY THROUGH OPTIONAL SIGNAL COMBINING BETWEEN RELAY STATIONS IN A CELLULAR SYSTEM USING WIRED RELAY STATIONS

CLAIM OF PRIORITY

This application claims the benefit of the earlier filing date, under 35 U.S.C. §119(a), to that patent application filed in the Korean Intellectual Property Office on Feb. 16, 2007 and assigned Serial No. 2007-16814, the disclosure of which is incorporated herein by reference.

BACKGROUND OF THE INVENTION

1. Field of the Invention

The present invention relates generally to a Radio Resource Management (RRM) technique in a cellular communication system and more particularly to RRM in cellular communication system including Relay Stations (RSs) using dedicated lines, and a Mobile Station (MS) located at a coverage boundary of an RS receives the same resources from two neighboring RSs through collaborative scheduling to increase Quality of Service (QoS) of its channel by signal combining.

2. Description of the Related Art

Efficient management and allocation of frequency resources is one of the major core technologies for continuous development of communication systems. To this end, multi-hop transmission schemes have been widely used, which are extended from the conventional single-hop transmission scheme that allow only the direct transmission from one Base Station (BS) per cell to the MSs within the cell. In a system supporting multi-hop transmission, a signal from a BS is transmitted to an MS via an RS, and direct transmission from the BS to the MS is also possible. A structure of a single-hop system has one BS per cell without a relay, and in this structure, a terminal, or MS, is directly connected to the BS without separate relay. A relay system additionally installs relays between the BS and MSs to improve signal reception performance of MSs located at a cell boundary or a shadow area. Of the multi-hop transmission schemes, a wireless multi-hop transmission scheme has been widely used, which connects the link between the BS and the RS in a wireless manner.

The RS system can be classified into a wired optical fiber RS system and a wireless Radio Frequency (RF) RS system according to the link between the BS and the RS. The wired RS has less signal attenuation but has no mobility, while the wireless RS has low installation cost, but amplifies and broadcasts all received signals regardless of the signal desired by an MS and an interference signal. Recently, in order to save resources necessary for BS-RS data transmission of the wireless multi-hop system, intensive research is being conducted to secure more resources that can be transmitted to MSs by replacing the BS-RS link with the wired optical fiber, and to efficiently apply the centralized RRM technique through the BS-RS wired link.

SUMMARY OF THE INVENTION

An aspect of the present invention is to improve channel condition of MSs located at the RS coverage boundary by performing optional signal combining depending on channel information of each individual subchannel from neighboring RSs in a cellular system using wired RSs, thereby increasing the entire cell transmission capacity and realizing a reduction in QoS outage probability of MSs.

According to one aspect of the present invention, there is provided a method for increasing cell capacity through optional signal combining between Relay Stations (RSs) in a cellular system using wired RSs. The method includes receiving, by a Base Station (BS), an average Carrier-to-Interference ratio (C/I) value of transmission signals from Mobile Stations (MSs) located inside each coverage area, being fed back from the RSs or the MSs in its corresponding cell, classifying the MSs into two groups according to the C/I value; performing resource allocation satisfying a minimum data rate from a corresponding RS, for MSs belonging to a group having a C/I value greater than a preset threshold Γ among the classified groups, performing resource allocation by applying an optional signal combining scheme taking into account two RSs having a highest C/I value, for MSs belonging to a group having a C/I value below the threshold among the classified groups and allocating all unallocated subchannels of each individual RS in an order of an MS having a high C/I value among MSs of a corresponding RS until there is no more unallocated subchannel of each RS According to another aspect of the present invention, there is provided an apparatus for increasing cell capacity through optional signal combining between Relay Stations (RSs) in a cellular system using wired RSs. The apparatus includes a Base Station (BS) for receiving a signal of a Mobile Station (MS) from each of the RSs and the MS, and transmitting data to each of the RSs and the MS depending on the received signal, a plurality of wired RSs for delivering information regarding MSs in corresponding coverage to the BS, and performing resource allocation to corresponding MSs and a plurality of MSs for receiving resources allocated from each of the RSs and updating the resource allocation information.

BRIEF DESCRIPTION OF THE DRAWINGS

The above and other aspects and features of the present invention will become more apparent from the following detailed description when taken in conjunction with the accompanying drawings in which.

DETAILED DESCRIPTION OF THE INVENTION

Exemplary embodiments of the present invention are now described with reference to the annexed drawings. In the following description, detailed descriptions of known functions and configurations incorporated herein have been omitted for clarity and conciseness.

The cellular system using wired RSs, or the wired RS-based cellular system, has no need for an additional band for BS-RS data transmission as described above, and in this system, RSs, including the BS, can perform RRM in a parallel manner. For an RS selection process of determining to which RS the MSs belong (or is mapped) to receive data, the system can consider using at least one of a scheme of (1) mapping a corresponding MS to an RS having the highest Carrier-to-Interference ratio (C/I) among average C/Is of signals received from the RS to the MS, (2) appropriately mapping MSs in a distributed manner depending not only on the C/I information but also on the number (or traffic amount) of MSs belonging to each individual RS, or (3) comparing C/I for each individual subchannel as well as considering average C/I information from a neighboring RS, for the MSs located at the RS coverage boundary, thereby efficiently obtaining the high transmission capacity. A description will now be made of a process of allocating resources for each individual subchannel, following the RS selection process. For the resource allocation process, the system can consider using at least one of a maximum C/I scheme of allocating a corresponding subchannel to an MS with the highest C/I separately for each individual subchannel, a Proportional Fairness (PF) scheme, or an additionally considered conditional metric, of allowing an MS having a large amount of data allocated, to have a lower priority during resource allocation, and a Round Robin (RR) scheme of uniformly performing resource allocation between MSs belonging to a corresponding RS without any priority for each individual subchannel in a round robin manner.

Figure 1:
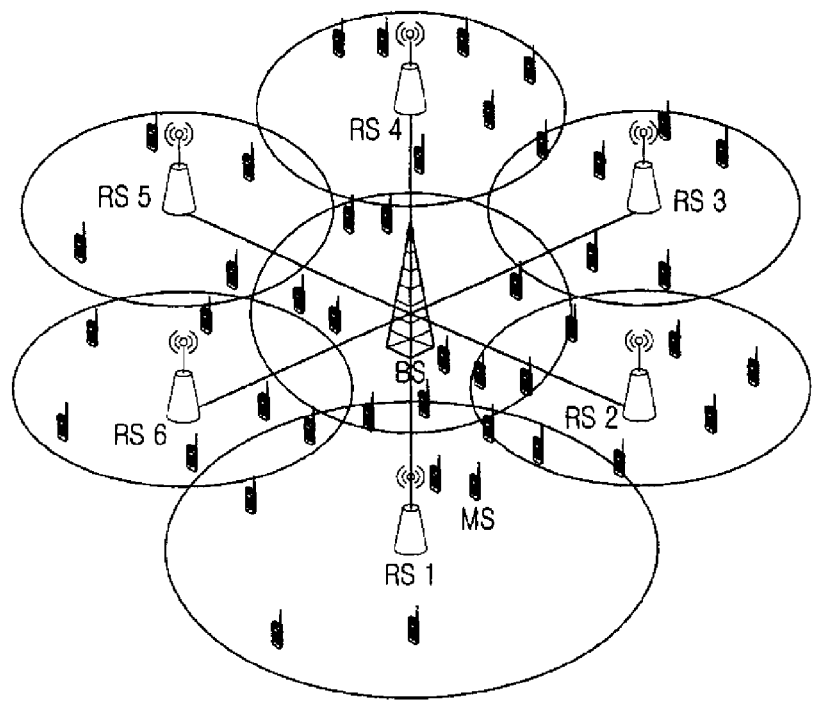
FIG. 1 is a schematic block diagram illustrating a configuration of a wired RS-based cellular system to which the present invention is applicable.

FIG. 1 is a schematic block diagram illustrating a configuration of a wired RS-based cellular system to which the present invention is applicable, and particularly illustrating a configuration of a wired RS system in which the number of RSs is 6. As shown in FIG. 1, one cell can be composed of one BS and 6 RSs (RS1 to RS6), and each RS covers its corresponding sub-cell area. This wired RS system, as shown in FIG. 1, can be split into 7 cells as the mobile station serves as an RS. Mobile stations located inside the cell boundary smoothly receive services from the corresponding RS, but MSs that have lower reception capability as they are located at the cell boundary, may receive services from neighboring RSs.

However, MSs located at the RS coverage boundary can hardly receive regularly allocated resources because their subchannels allocated from RSs are different in signal level. Under the condition that the required Quality of Service (QoS), e.g., minimum data rate, is satisfied, the expected sufficient transmission capacity (cell throughput) and QoS outage probability of the whole cell can hardly be achieved with the existing RRM technique. For example, when the sole object is to optimize the transmission capacity, the use of the maximum C/I scheme optimizes the transmission capacity but causes considerable degradation in fairness performance between MSs. That is, as the transmission capacity concentrates on a particular MS, transmission to other MSs is affected. In contrast, when the sole object is to maintain fairness, resources are used inefficiently, causing degradation in terms of transmission capacity.

Considering the matters mentioned with regard to FIG. 1, the present invention proposes a new configuration that first allocates resources to MSs located inside the RS coverage boundary, determines whether an operation of combining signals from two neighboring RSs separately for each individual subchannel, while considering both an RS selection process and a per-subchannel resource allocation process for the MSs located at the RS coverage boundary, to contribute to an increase in transmission capacity, and then optionally combines signals according to the determination result, thereby performing smooth resource allocation.

Figure 2:
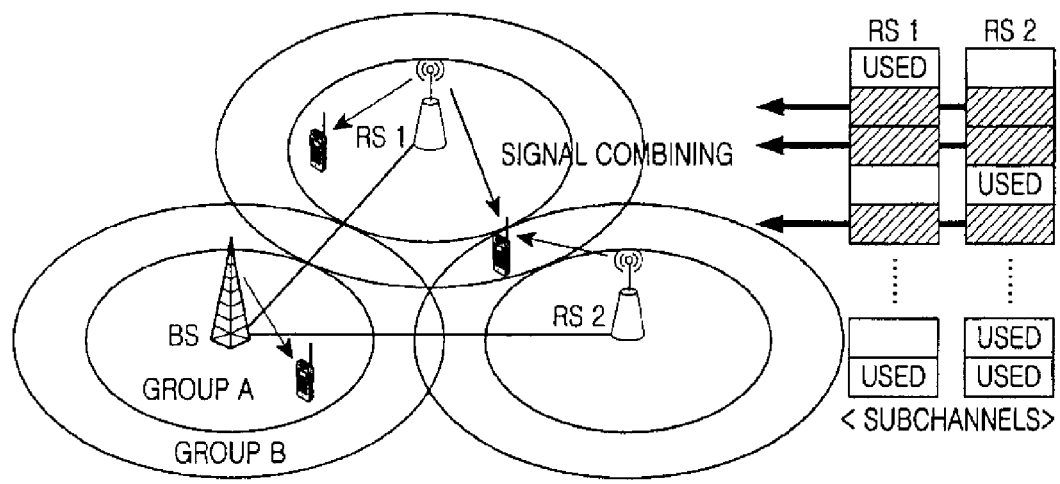
FIG. 2 is a diagram illustrating a signal combining configuration at a coverage boundary between two neighboring RSs in a wired RS-based cellular system according to an embodiment of the present invention.

FIG. 2 is a diagram illustrating a signal combining configuration at a coverage boundary between two neighboring RSs in a wired RS-based cellular system according to an embodiment of the present invention. For an MS located at the RS coverage boundary, signal strengths from neighboring RSs are similar, showing a low C/I. In this case, if the corresponding MS optionally combines signals from an RS having the highest C/I value and an RS having the second highest C/I value among the neighboring RSs before transmission, its C/I value is improved, so the corresponding MS can receive data at a high data rate. In this case, the corresponding MS may simply demodulate data on the corresponding subchannel without a special signal processing process on the received signal. Because the resource allocation process already performs signal combining so that channel condition of the corresponding subchannel may have a high C/I value, the MS does not need a separate signal processing process. Referring to FIG. 2, for an MS in Group B, signal combining can be applied thereto according to conditions of available subchannel resources of an RS1 and an RS2. In FIG. 2, parts denoted by 'Used' indicate resources that have already been allocated in a resource allocation process for Group A. During signal combining, it is possible to improve the RS1-RS2 signals (signals between RS1 and RS2) to desired reception signal components by allocating the same resources available in both of the RSs in addition to the already allocated resources and then transmitting same data over the resources. With reference to a graph of FIG. 3, a description will now be made of an increase in the cell capacity.

Figure 3:
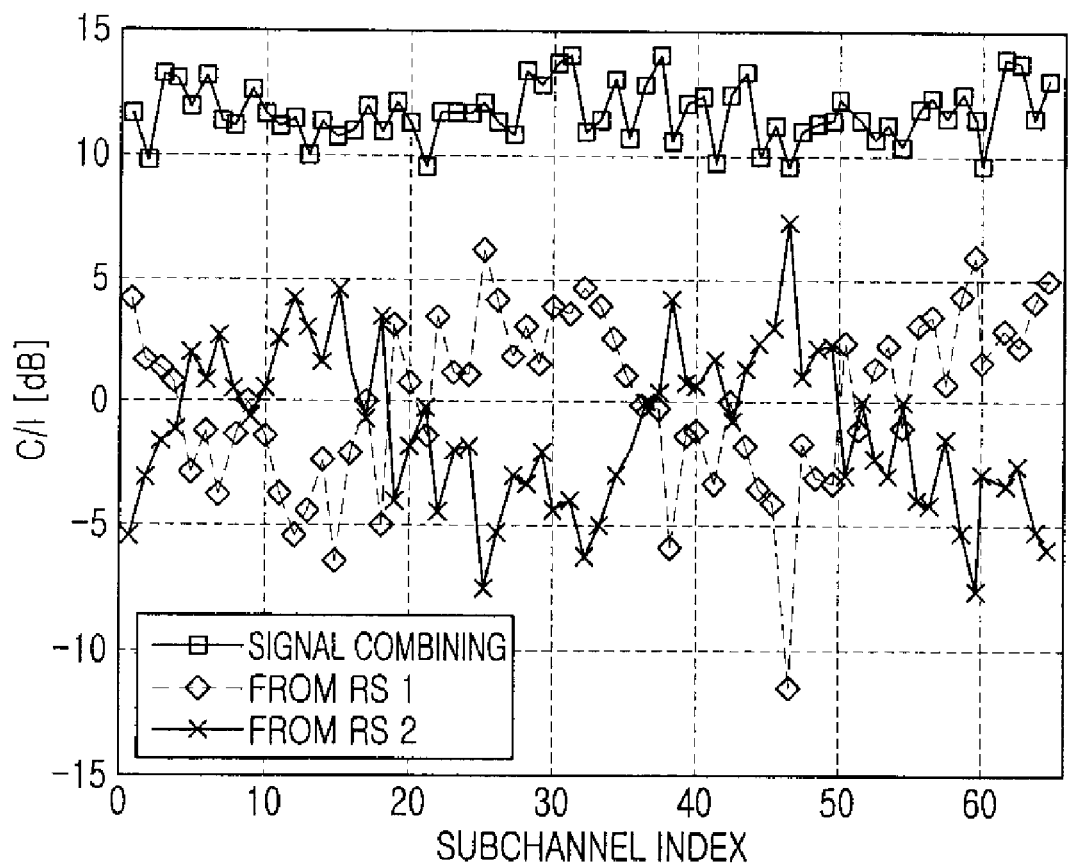
FIG. 3 is a graph illustrating a comparison between a C/I gain for signals from two neighboring RSs and a C/I gain for a combined signal of the two signals in a wired RS-based cellular system according to an embodiment of the present invention.

FIG. 3 is a graph illustrating a comparison between a C/I gain for signals from two neighboring RSs and a C/I gain for a combined signal of the two signals in a wired RS-based cellular system according to an embodiment of the present invention. It can be noted from FIG. 3 that an average C/I for RS1 and RS2 before signal combining shows 0 dB. For MSs located inside the RS coverage boundary, smooth resource allocation is possible even with the 0-dB average C/I. However, MSs located at the RS coverage boundary may suffer from considerable interference due to signal interference from neighboring RSs. Due to the interference, an average C/I for the MSs actually located at the RS coverage boundary decreases to below 0 dB, thereby deteriorating the QoS and thus causing the low reception sensitivity and the outage condition. Referring to the graph of the combined signal of the signals from the RS1 and the RS2, an average C/I after signal combining shows 12 dB, an improvement of 12 dB compared to the average C/I gain before signal combining. The improvement of the average C/I gain enables smooth resource allocation for the MSs located at the RS coverage boundary, contributing to improvement of the QoS.

Table 1 shows a change in Modulation and Coding Selection (MCS) level predefined with respect to C/I gain according to the present invention.

TABLE 1

Modulation and Coding Scheme for IEEE 802.16e

| MCS level | C/I (dB) | Modulation | Coding rate | Number of transmitted bits |
|---|---|---|---|---|
| 1 | −3.4 | QPSK | 1/12 | 1/6 |
| 2 | −0.95 | QPSK | 1/6 | 1/3 |
| 3 | 1.65 | QPSK | 1/3 | 2/3 |
| 4 | 4.65 | QPSK | 1/2 | 1 |
| 5 | 8.45 | QPSK | 2/3 | 4/3 |
| 6 | 10.05 | 16QAM | 1/2 | 2 |
| 7 | 14.30 | 16QAM | 2/3 | 8/3 |
| 8 | 14.25 | 64QAM | 1/2 | 3 |

TABLE 1-continued

Modulation and Coding Scheme for IEEE 802.16e

| MCS level | C/I (dB) | Modulation | Coding rate | Number of transmitted bits |
|---|---|---|---|---|
| 9 | 19.50 | 64QAM | 2/3 | 4 |
| 10 | 27.30 | 64QAM | 5/6 | 5 |

Figure 4:
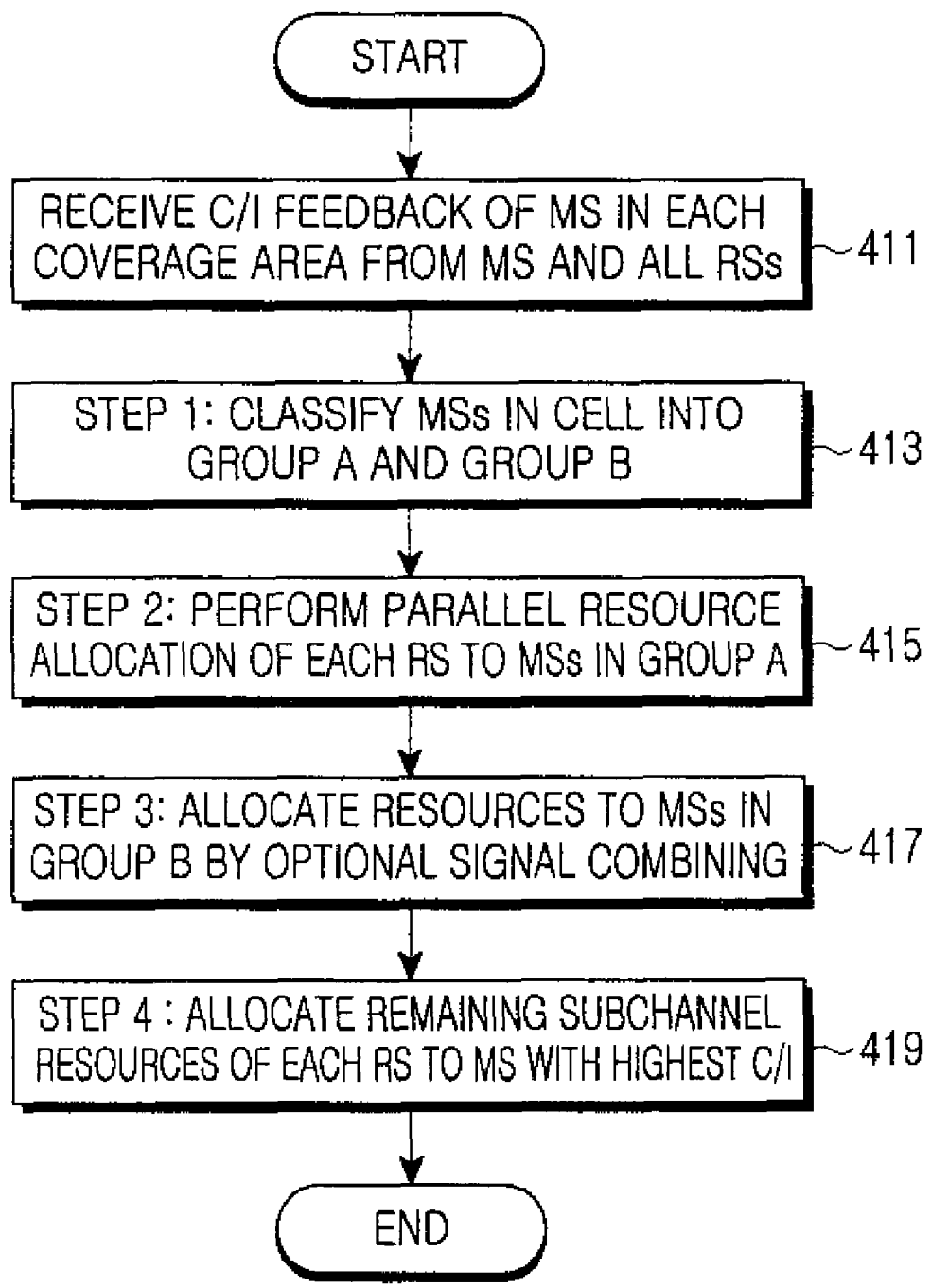
FIG. 4 is a flowchart illustrating resource allocation for all MSs to which an optional signal combining scheme for Group B is applied according to an embodiment of the present invention.

Referring to Table 1, it can be seen that an MCS level is 3 for a 0-dB C/I gain, but the MCS level increases up to 7 when a C/I gain of a combined signal of two signals is 12 dB. An increase in the MCS level improves an average C/I obtained through signal combining, so the existing transmission capacity of 0.33 bits/subcarrier improves to the transmission capacity of 2.00 bits/subcarrier. Thus, contributing to improvement of frequency efficiency. When appropriate signal combining is not achieved as the resources are repeatedly used due to the signal combining, the entire transmission capacity may decrease undesirably. However, it an appropriate signal combination is found and then signal combining is performed thereon, high performance gain can be expected even though the repeated use of the resources is taken into account. With reference to FIG. 4, a description is now made with regard to resource allocation for all MSs to which the optional signal combining is applied.

FIG. 4 is a flowchart illustrating resource allocation for all MSs to which an optional signal combining scheme for Group B is applied according to an embodiment of the present invention. Referring to FIG. 4, in step 411, a BS directly receives C/Is of MSs in each coverage area, being fed back from all RSs or MSs. With use of the C/I information, resource allocation of STEP 1 to STEP 4 shown in FIG. 4 is performed. In step 413, the BS classifies MSs into Group A and Group B using the C/I feedback information. In step 415, for the MSs belonging to Group A, resource allocation is achieved separately for each individual RS, and this resource allocation can be performed in the RSs in a parallel manner, or can be performed in the BS in an integrated manner. After completing resource allocation process for MSs in Group A, the BS performs, in step 417, both RS selection and resource allocation for MSs in Group B using the subchannels unallocated in step 415. After completing the resource allocation for each group, the BS performs additional resource allocation for the remaining unallocated subchannels in step 419. In this manner, the BS can maximize the entire cell transmission capacity.

For a detailed description of each step, definitions of the parameters used in each step are given, and each step will be described in detail with reference to an equation based on the parameters. It is assumed herein that one cell basically includes one BS that has "S" RSs and "K" MSs desiring a service, to which "N" subchannels are given. The amount of data corresponding to the minimum data rate at which each MS should receive data, is assumed to be '$R_{min}$'. The number of bits that can be transmitted according to channel condition of a subchannel gin that an MS #k uses in an RS #s, is defined as '$c_{k,n,s}$'. For example, for $c_{k,n,s}=2$, the MS can transmit data with 16 QAM at a coding rate of R=½. When a subchannel #n of an RS #s is allocated to an MS #k, a corresponding parameter is denoted by '$\rho_{n,s}$', and defined as $\rho_{n,s}=k$. A function $[\rho_{n,s}]$, which is a binary variable, indicates to which MS of a subchannel #n of an RS #s it has been allocated or not allocated. This function is expressed as Equation (1).

$$[\rho_{n,s}] = \begin{cases} 1 & \text{if } \rho_{n,s} \neq 0 \\ 0 & \text{if } \rho_{n,s} = 0 \end{cases} \quad (1)$$

In the wired RS-based cellular system, the final goal of RS selection and resource allocation is to maximize the entire cell transmission capacity without causing outage. With use of the parameters, this can be expressed as Equation (2).

$$\text{maximize} \sum_{s=1}^{S} \sum_{n=1}^{N} c_{\rho_{n,s}n,s} \quad (2)$$

$$\text{subject to } \sum_{s} \sum_{n} c_{k,n,s} \geq R_{min} \text{ for } k = 1, \ldots, K$$

In Equation (2), the 'subject' term means that all MSs should satisfy the minimum data rate. Therefore, only n and s for $\rho_{n,s}=k$ are summed and this value should satisfy the minimum data rate. In order to maximize the target function of Equation (2) under this condition, a resource allocation flow based on the signal combining presented in the present invention will be described below.

In STEP 1, the BS calculates an average C/I of a corresponding band using channel information fed back from each MS, and classifies MSs into Group A and Group B through a threshold (Γ) test. Group A is a group composed of MSs having a higher C/I in particular RSs, and Group A is defined as $U_s$ and receives resources allocated from the corresponding RS or the BS. MSs having an average C/I less than a threshold are classified as Group B, and are defined as the set of V. Generally, these MSs are located at the RS coverage boundary. A description will now be made of the relationship between the MS grouping process and the threshold. If the threshold is very high, all MSs, as they belong to Group B, are superior in terms of the performance because of the C/I increased due to signal combining, but all possible RS-MS combinations should be found, causing a considerable increase in the complexity. If the threshold has a value of 0, all MSs, as they belong to Group A, need no RS selection process, so their complexity decreases noticeably but their performance will decrease undesirably. Therefore, in setting the threshold, the trade-off relationship between the performance and the complexity should be taken into consideration. That is, the present invention is directed to a method of setting the threshold considering the relationship between the performance and the complexity, wherein the threshold is varied in accordance with the number of the MS in the single cell. A detailed flowchart for the STEP-1 process is shown in FIG. 5.

Figure 5:
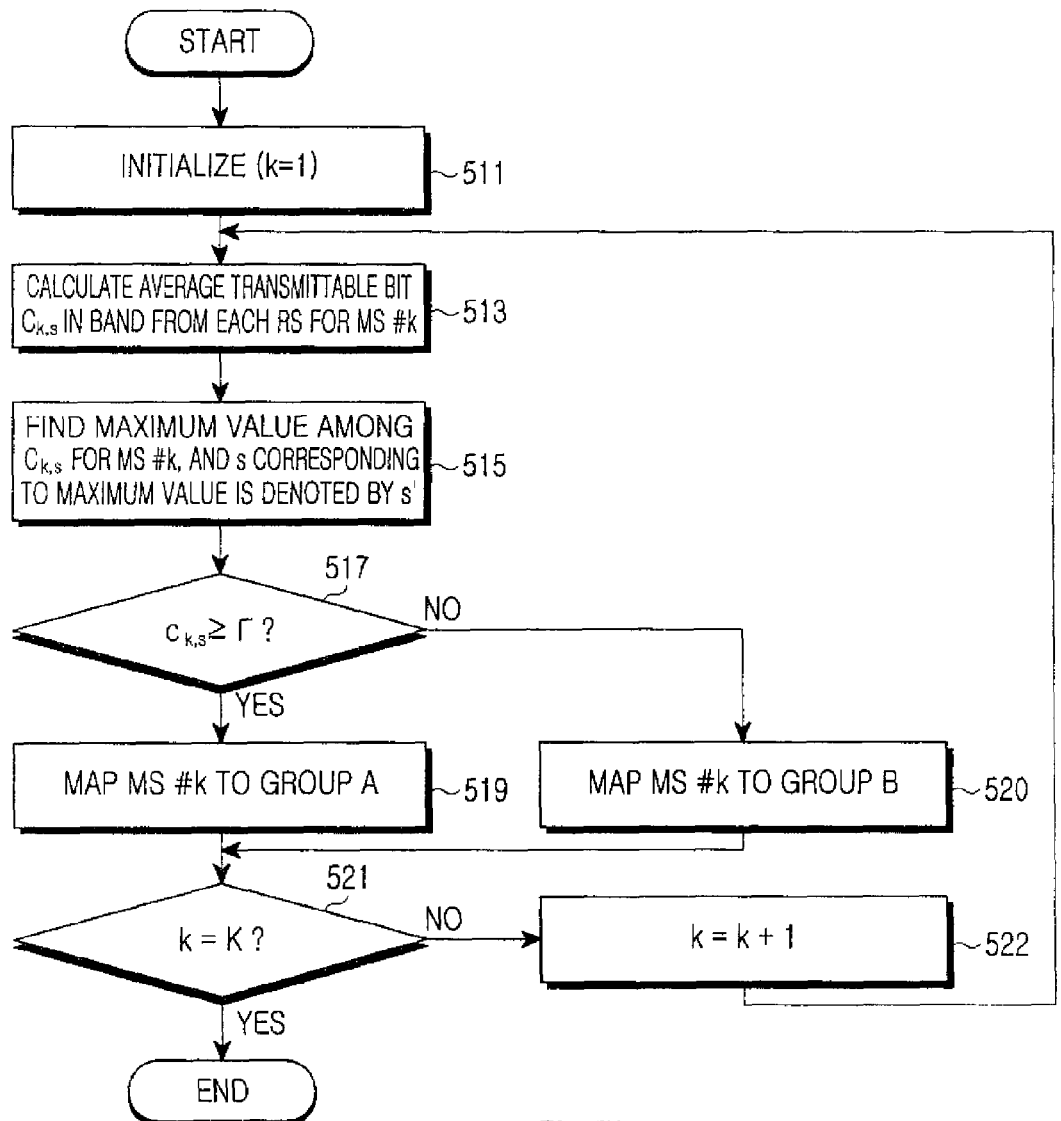
FIG. 5 is a detailed flowchart for a STEP-1 process of FIG. 4.

FIG. 5 is a flowchart for a process of grouping all MSs in a cell into Group A and Group B. Referring to FIG. 5, the BS initializes the defined parameter k to 1 in step 511, and calculates average transmittable bits $c_{k,s}$ of a band from each RS for an MS #k in step 513, and the average transmittable bits $c_{k,s}$ are expressed as Equation (3).

$$c_{k,s} = \frac{1}{N} \sum_{n=1}^{N} c_{k,n,s}, \forall s \quad (3)$$

After calculating the average transmittable bits for k, the BS finds the maximum value among the average transmittable bit values calculated for k in step 515. A process of finding the maximum value can be expressed as Equation (4).

$$s' = \underset{s}{\operatorname{argmax}}(c_{k,s}) \tag{4}$$

where s' denotes s corresponding to the maximum value.

In step 517, the BS compares the calculated maximum transmittable bit value with the threshold. If the calculated maximum transmittable bit value is greater than or equal to the threshold, the BS maps the MS #k to Group A in step 519. If the calculated maximum transmittable bit value is less than the threshold, the BS maps the MS #k to Group B in step 520. If the MS #k has a value K (k=K) in step 521, the BS ends the process. However, if the MS #k does not have a value K (k≠K), the BS proceeds to step 522 where it increases k by 1 (k=k+1). This process is repeated until k=K, completing the grouping. A detailed algorithm for FIG. 5 is shown in Table 2.

TABLE 2

$U_s = \phi$, $\forall s$, and $V = \phi$
for k=1 : K $$\text{Calculate } c_{k,s} = \frac{1}{N}\sum_{n=1}^{N} c_{k,n,s}, \forall s$$

Select s' = $\underset{s}{\operatorname{argmax}}(c_{k,s})$ if ($c_{k,s'} > \Gamma$)
    $U_{s'} = U_{s'} \cup \{k\}|$
else
    $V = V \cup \{k\}$
end
end Next, a resource allocation flow for Group A will be described in STEP 2. In STEP 2, resource allocation for MSs belonging to $U_s$ (s=1, . . . , S), i.e. Group A, defined in STEP 1 is achieved, and the resource allocation can be performed in the RSs in a parallel manner, or can be performed in the BS in an integrated manner. Subchannel allocation to each MS in $U_s$ is achieved until a given RS #s satisfies the minimum data rate. A detailed flowchart for the STEP-2 process is shown in FIG. 6.

Figure 6:
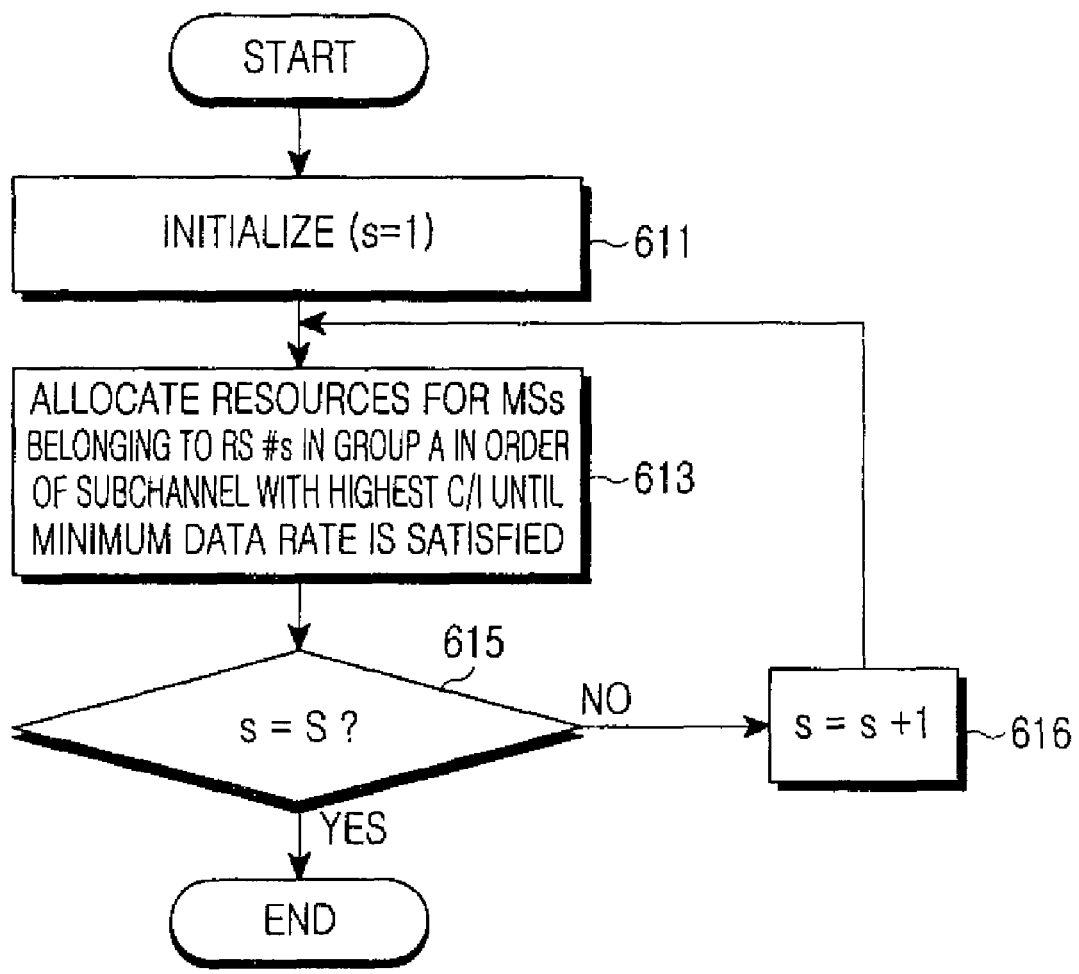
FIG. 6 is a detailed flowchart for a STEP-2 process of FIG. 4.

FIG. 6 is a flowchart for resource allocation for Group A. Referring to FIG. 6, the BS initializes the defined parameter s to 1 in step 611, and allocates in step 613 resources for MSs belonging to an RS #s in Group A in the order of the highest-C/I subchannel until the minimum data rate is satisfied. The process in step 613 is expressed as Equation (5).

$$n' = \underset{n}{\operatorname{argmax}}(c_{k_u,n,s}(1-[\rho_{n,s}])) \tag{5}$$

$$R = R + c_{k_u,n',s}$$

It can be seen in Equation (5) that resources are allocated in the order of the highest-C/I subchannel n' until the minimum data rate is satisfied. If resources have been allocated to all MSs in Group A in step 615, the process is ended. However, if the resources have not been allocated to all MSs in Group A, the BS proceeds to step 616, and the process is repeated until the resource allocation is completed. After completion of resource allocation for Group A, the BS performs resource allocation for Group B. A detailed algorithm for FIG. 6 is shown in Table 3.

TABLE 3 for s=1 :S
    $U_s = \{k_1, k_2, \ldots, k_u, \ldots\}$
    for u=1 :|$U_s$|
        R=0
        while (R<$R_{min}$)

Figure 7:
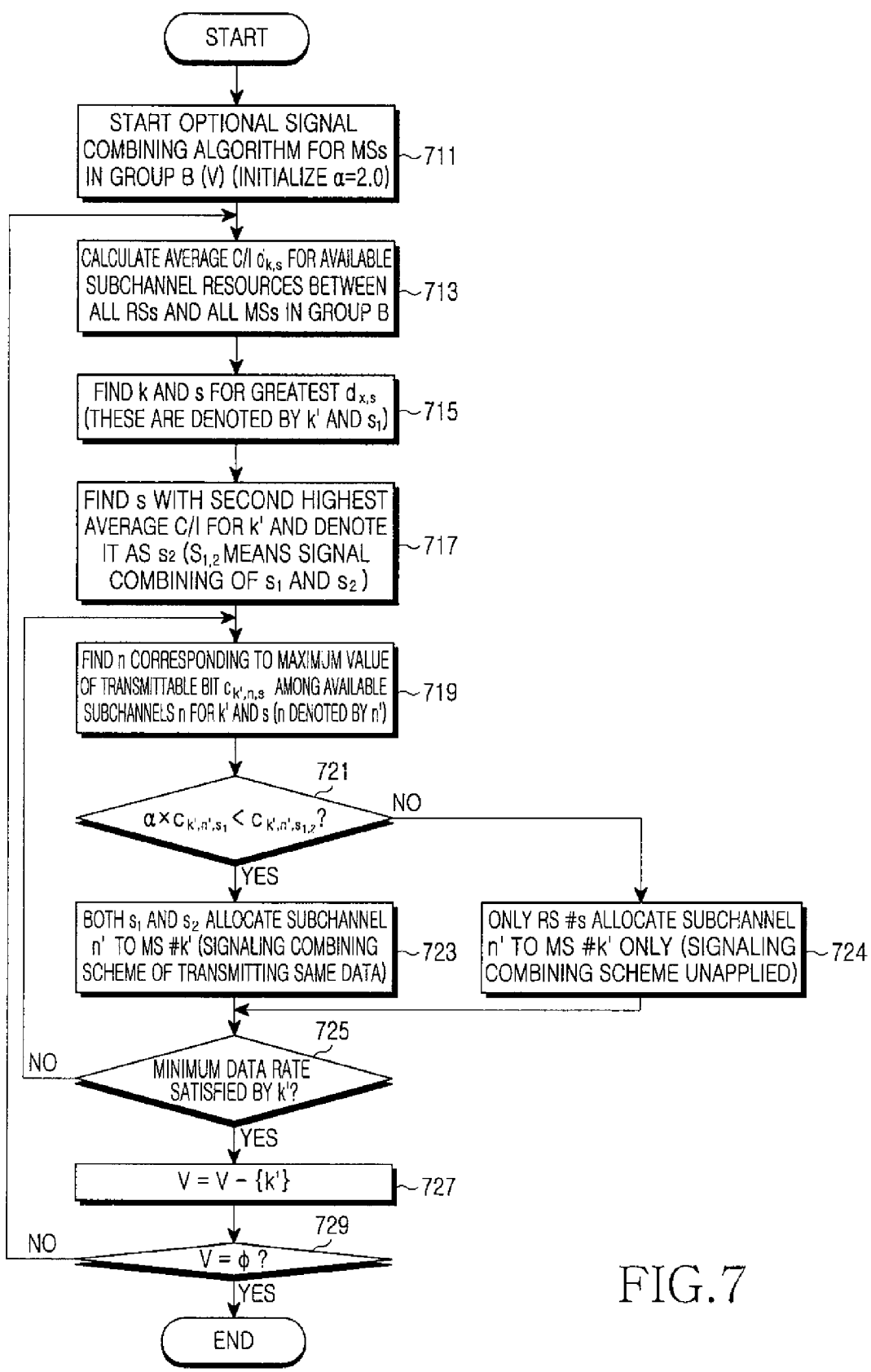
FIG. 7 is a detailed flowchart for a STEP-3 process of FIG. 4.

Select n' = $\underset{n}{\operatorname{argmax}}(c_{k_n,n,s}(1-[\rho_{n,s}]))$ $R = R + c_{k_u,n',s}$
        $\rho_{n',s} = k_u$
        end
    end
end A resource allocation flow for Group B is described in STEP 3. In STEP 3, for the MSs belonging to Group B, the BS calculates and uses metrics of the following equations for the subchannels unallocated in STEP 2, thereby performing RS selection and resource allocation simultaneously. FIG. 7 is a flowchart for resource allocation by an optional signal combining scheme for Group B according to an embodiment of the present invention. A detailed flowchart for the STEP-3 process is shown in FIG. 7.

In FIG. 7, a parameter related to a signal combining condition is defined as α. Here, α means that because the same subchannels are repeatedly allocated from two RSs during signal combining, the number of transmittable bits during application of the signal combining scheme should be greater than two times the number of transmittable bits by single resource allocation in an RS #$s_1$. A decreases in α causes an increase in the frequency of applications of signal combining, and it was found from simulation that for α=2.0, a suboptimal high-performance signal combining effect was sufficiently shown. The BS initializes α to 2.0 in step 711. The BS calculates in step 713 an average C/I for available subchannel resource between all RSs and all MSs in Group B using Equation (6).

$$d_{k,s} = \frac{1}{N_s}\sum_{n=1}^{N} c_{k,n,s}(1-[\rho_{n,s}]) \tag{6}$$

where $N_s$ denotes the number of unallocated subchannels.

In Equation (6), $d_{k,s}$ is defined as the average number of transmission bits for the subchannels unallocated yet from all RSs for each individual MS. Based on the value of Equation (6), the BS finds in step 715 a combination of a highest-C/I RS #$s_1$ and an MS #k, and first allocates subchannels thereto. The BS finds an RS #$s_2$ having the second highest average C/I for k in step 717, and finds, in step 719, n corresponding to the maximum value of transmittable bits $c_{k',n,s1}$ among available subchannels n, using the combination of the highest-C/I RS #$s_1$ and the MS #k, found in step 715. In step 721, the BS finds an RS #$s_2$ having the second highest average C/I for k, and checks a condition of Equation (7).

$$\alpha \times c_{k',n',s_1} < c_{k',n',s_{1,2}} \tag{7}$$

Equation (7) is a conditional metric to which optional signal combining is applied, and if the condition of Equation (7) is satisfied, a signal combining scheme of allocating corresponding subchannel resources of two RSs #$s_1$ and #$s_2$ to the MS #k in the same manner is applied in step 723. If the condition is not satisfied, the BS allocates only the corresponding subchannels of the RS #$s_1$ to the MS #k in step 724. Similarly to the STEP-2 process, the BS performs in step 725 the STEP-3 process until the minimum data rate is satisfied. The BS should find another combination and allocate resources to a corresponding MS, if it cannot satisfy the minimum data rate even though a given metric value is high. The BS removes the MS satisfying the minimum data rate from all MSs in step 727, and then repeatedly performs the STEP-3 process in step 729 until all MSs in Group B are allocated resources. For reference, it should be noted that the α value can be properly changed according to system environment and resource allocation goal. The detailed algorithm for FIG. 7 is shown in Table 4.

TABLE 4 while (V≠φ)

$$\text{Calculate } d_{k,s} = \frac{1}{N_s}\sum_{n=1}^{N} c_{k,n,s}(1 - [\rho_{n,s}]), k \in V, \forall s.$$

($N_s$ = number of unallocated subchannels for RS s)

$$\text{Select } k', s_1 = \arg\max_{k,s}(d_{k,s}) \text{ s.t. } \sum_{n=1}^{N} c_{k',n,s'}(1 - [\rho_{n,s'}]) \geq R_{min}$$

$$\text{Select } s_2 = \arg\max_{s(\neq s_1)}(d_{k',s})$$

R=0
while (R < $R_{min}$)

Select n' = $\arg\max_n(c_{k',n',s_1}(1 - [\rho_{n,s_1}]))$ if (α × $c_{k',n',s1}$ < $c_{k',n',s1,2}$)
R = R + $c_{k',n',s1,2}$
$\rho_{n',s1} = \rho_{n',s2} = k'$
else
R = R + $c_{k',n,s1}$
$\rho_{n',s1}$
end
end In STEP 4, resource allocation is additionally achieved to maximize the entire cell transmission capacity for the remaining unallocated subchannel after the entire STEP-3 process is completed. This is a process of additionally allocating corresponding subchannels to the highest-C/I MS, for the unallocated subchannels of each individual RS, and the entire STEP-4 process is completed at the time that there is no more unallocated subchannel of each RS. The detailed flowchart for the STEP-4 process is shown in FIG. 8.

Figure 8:
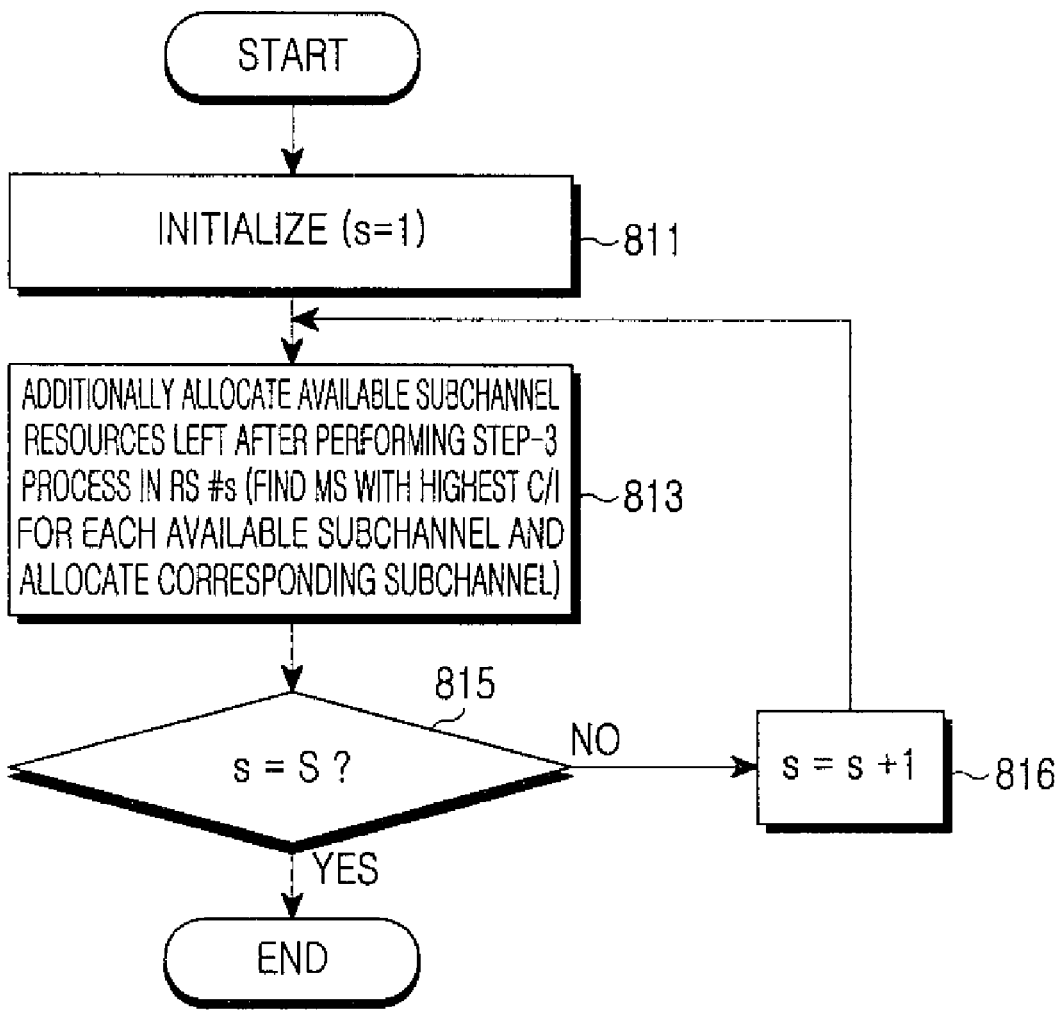
FIG. 8 is a detailed flowchart for a STEP-4 process of FIG. 4.

FIG. 8 is a flowchart for additional allocation of unallocated subchannels for an increase in the transmission capacity. Referring to FIG. 8, the BS initializes s to 1 in step 811, and then additionally allocates in step 813 the available subchannel resources left after performing the STEP-3 process in the RS #s, using Equation (8).

$$k' = \arg\max_{k}(c_{k,n,s}(1 - [\rho_{n,s}])), k \in U_s \quad (8)$$

With use of Equation (8), the BS finds a highest-C/I MS and allocates a corresponding subchannel thereto, for each individual available subchannel. If s=S is satisfied in step 815, the BS ends the process. However, if s=S is not satisfied, the BS proceeds to step 816 and repeats the process until s=S is satisfied. With use of this process, the BS can maximize the entire cell transmission capacity. The detailed algorithm for FIG. 8 is shown in Table 5.

TABLE 5 for s=1 :S
   for n=1 :N

Select k' = $\arg\max_k(c_{k,n,s}(1 - [\rho_{n,s}]))$, k ∈ $U_s$ $\rho_{n,s}$ = k'
   end
end The signal combining-based transmission capacity increasing technique can be presented not only as the core aspect of the present invention but also as other aspects. As another exemplary technique for overcoming the limitation of the prior art, there is a possible technique of applying signals from two RSs as desired signals obtained by signal combining without regarding them as interference signals as described above, and construing the two RSs as Multiple Input Multiple Output (MIMO) systems being spaced far away from each other, thereby maximizing a spatial diversity effect during signal combining. As further another exemplary technique, there is a possible transmission capacity increasing technique based on RS antenna beamforming and power control, i.e. a possible technique of applying directional weight vectors to signals transmitted from RS antennas and, before transmission, previously performing signal processing on the transmission signals so that a reception C/I according to position of MSs may be improved. Both of the two presented techniques can increase the entire cell transmission capacity.

As is apparent from the foregoing description, according to the present invention, the wired RS-based cellular system classifies all MSs in a cell into Group A having a high average C/I, and Group B having a low average C/I as its MSs are located at the RS coverage boundary. For Group A, the system performs resource allocation separately for each corresponding RS without separate RS selection process, thereby reducing the complexity. For Group B, the system applies optional signal combining schemes from two RSs showing the highest C/I, thereby increasing the entire cell transmission capacity and reducing the outage probability.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for increasing cell capacity through optional signal combining between Relay Stations (RSs) in a cellular system using wired RSs, the method comprising:

receiving, by a Base Station (BS), an average Carrier-to-Interference ratio (C/I) value of transmission signals from Mobile Stations (MSs) located inside each coverage area, being fed back from the RSs or the MSs in its corresponding cell;

classifying the MSs into two groups according to the C/I value;

performing resource allocation satisfying a minimum data rate from a corresponding RS, for MSs belonging to a group having a C/I value greater than a preset threshold .GAMMA. among the classified groups;

performing resource allocation by applying an optional signal combining scheme taking into account a combination of two RSs having a highest C/I value, for MSs belonging to a group having a C/I value below the threshold among the classified groups by;

applying signal combining of the RS with the highest C/I value and the RS with the second highest C/I value, if $\alpha \times C_{k',n',s_1} < C_{k',n',s_{1,2}}$ is satisfied; and allocating corresponding subchannels only for the RS with the highest C/I value if $\alpha \times C_{k',n',s_1} < C_{k',n',s_{1,2}}$ is not satisfied, wherein $\alpha$ is a parameter related to signal combining condition, an MS having a highest C/I value in a corresponding group is defined as k', an RS with a highest C/I value and an RS with a second highest C/I value are defined as $s_1$ and $s_2$, respectively, and a subchannel corresponding to a maximum value of transmittable bits among available subchannels n for k' and $s_1$ is defined as n', $c_{k,n,s}$ is defined as a number of transmission bits satisfying a target Bit Error Rate (BER) taking into account a signal level for a subchannel #n that an MS #k has received from an RS #s, and allocating all unallocated subchannels of each individual RS in an order of an MS having a high C/I value among MSs of a corresponding RS until there is no more unallocated subchannel of each RS.

2. The method of claim 1, wherein classifying the MSs into two groups according to the C/I value comprises:

calculating, by the BS, each average transmission bit receivable from each RS;

finding an RS having a maximum value among the calculated average transmission bits;

comparing an average transmission bit corresponding to the RS having the maximum value with the threshold; and classifying a group of the corresponding MSs into two groups according to the comparison result.

3. The method of claim 1, wherein performing resource allocation satisfying a minimum data rate for MSs belonging to a group having a C/I value greater than a preset threshold comprises:

selecting, by the BS, a subchannel having a high C/I value for the MSs belonging to a group having the C/I value greater than the threshold among the unallocated subchannels to allocate a subchannel to each MS; and allocating subchannels until the minimum data rate for the corresponding MS is satisfied.

4. The method of claim 1, wherein performing resource allocation for MSs belonging to the group having a C/I value below the threshold comprises:

defining a parameter $\alpha$ for a signal combining condition of an RS belonging to a corresponding group;

calculating the C/I value for available subchannel resources between all RSs and MSs belonging to the corresponding group as:

$$d_{k,s} = \frac{1}{N_s} \sum_{n=1}^{N} c_{k,n,s}(1 - [\rho_{n,s}])$$

where $N_s$ denotes a number of subchannels unallocated for each individual RS, an RS is defined as s (=1, 2, ..., S), a subchannel is defined as n (=1, 2, ..., N), an MS is defined as k (=1, 2, ..., K), and $\rho_{n,s}$ is defined as a parameter that has a value of k when an MS #k uses a subchannel #n of an RS #s, and otherwise, has a value of 0;

finding, by the BS, a combination of an RS having a highest C/I value and an MS;

checking a condition $\alpha \times C_{k',n',s_1} < C_{k',n',s_{1,2}}$ where $\alpha$ is defined as a parameter related to signal combining condition, an MS having a highest C/I value in a corresponding group is defined as k', an RS with a highest C/I value and an MS with a second highest C/I value are defined as $s_1$ and $s_2$, respectively, and a subchannel corresponding to a maximum value of transmittable bits among available subchannels n for k' and $s_1$ is defined as n';

applying signal combining of the RS with the highest C/I value and the RS with the second highest C/I value, if the condition $\alpha \times C_{k',n',s_1} < C_{k',n',s_{1,2}}$ is satisfied;

allocating corresponding subchannel only for the RS with the highest C/I value if the condition $\alpha \times C_{k',n',s_1} < C_{k',n',s_{1,2}}$ is not satisfied; and allocating the subchannels until the minimum data rate of the corresponding MS is satisfied;

wherein the above steps are repeatedly performed for all MSs in the corresponding group.

5. A system for increasing cell capacity through optional signal combining between Relay Stations (RSs) in a cellular system using wired RSs, the system comprising:

a Base Station (BS) for receiving a signal of a Mobile Station (MS) from each of the RSs and the MS, and transmitting data to each of the RSs and the MS depending on the received signal;

a plurality of wired RSs for delivering information on MSs in corresponding coverage to the BS, and performing resource allocation to corresponding MSs, a plurality of wired RSs for delivering information regarding MSs in corresponding coverage areas to the BS, and performing resource allocation to corresponding MSs, wherein a first method of resource allocation is performed on a group of MSs having a carrier/interference ratio (C/I) value greater than a threshold and a second method of resource allocation is performed on a group of MSs having a (C/I) value less than the threshold, by:

classifying the MSs into two groups according to the C/I value;

applying signal combining of the RS with the highest C/I value and the RS with the second highest C/I value, if $\alpha \times C_{k',n',s_1} < C_{k',n',s_{1,2}}$ is satisfied;

allocating corresponding subchannel only for the RS with the highest C/I value if $\alpha \times C_{k',n',s_1} < C_{k',n',s_{1,2}}$ is not satisfied, wherein $\alpha$ is a parameter related to signal combining condition, an MS having a highest C/I value in a corresponding group is defined as k', an RS with a highest C/I value and an RS with a second highest C/I value are defined as $s_1$ and $s_2$, respectively, $c_{k,n,s}$ is defined as a number of transmission bits satisfying a target Bit Error Rate (BER) taking into account a signal level for a subchannel #n that an MS #k has received from an RS #s, and a subchannel corresponding to a maximum value of transmittable bits among available subchannels n for k' and $s_1$ is defined as n'; and a plurality of MSs for receiving resources allocated from each of the RSs and updating the resource allocation information.

6. The system of claim 5, wherein the BS receives an average Carrier-to-Interference ratio (C/I) of a transmission signal of the MS, being fed back from each of the RSs and the MS, and performing resource allocation and scheduling depending thereon in an integrated manner.

7. The system of claim 5, wherein the RS delivers information on MSs in the corresponding coverage to the BS, performs scheduling independently for packets to be transmitted to a corresponding MS, and performs resource allocation from the BS to the corresponding MS.

8. An apparatus for increasing cell capacity through optional signal combining between Relay Stations (RSs) in a cellular system using wired RSs, the apparatus comprising:

a processor in communication with a memory, the memory including code therein which provides instruction to said processor to cause the processor to execute:

determining an average Carrier-to-Interference ratio (C/I) value of transmission signals from Mobile Stations (MSs) located inside each coverage area, being fed back from the RSs or the MSs in its corresponding cell;

classifying the MSs into two groups according to the average C/I value;

performing resource allocation satisfying a minimum data rate from a corresponding RS, for MSs belonging to a group having a C/I value greater than a preset threshold .GAMMA. among the classified groups;

performing resource allocation by applying an optional signal combining scheme taking into account a combination of two RSs having a highest C/I value, for MSs belonging to a group having a C/I value below the threshold among the classified groups by;

applying signal combining of the RS with the highest C/I value and the RS with the second highest C/I value, if $\alpha \times C_{k',n',s_1} < C_{k',n',s_{1,2}}$ is satisfied; and allocating corresponding subchannels only for the RS with the highest C/I value if $\alpha \times C_{k',n',s_1} < C_{k',n',s_{1,2}}$ is not satisfied, wherein $\alpha$ is a parameter related to signal combining condition, an MS having a highest C/I value in a corresponding group is defined as k', an RS with a highest C/I value and an RS with a second highest C/I value are defined as $s_1$ and $s_2$, respectuvely, and a subchannel corresponding to a maximum value of transmittable bits among available subchannels n for k' and $s_1$ is defined as n';

$C_{k,n,s}$ is defined as a number of transmission bits satisfying a target Bit Error Rate (BER) taking into account a signal level for a subchannel #n that an MS #k has received from an RS #s, and allocating all unallocated subchannels of each individual RS in an order of an MS having a high C/I value among MSs of a corresponding RS until there is no more unallocated subchannel of each RS.

9. The apparatus of claim 8, wherein classifying the MSs into two groups according to the C/I value comprises:

calculating each average transmission bit receivable from each RS;

finding an RS having a maximum value among the calculated average transmission bits;

comparing an average transmission bit corresponding to the RS having the maximum value with the threshold; and classifying a group of the corresponding MSs into two groups according to the comparison result.

10. The apparatus of claim 8, wherein performing resource allocation satisfying a minimum data rate for MSs belonging to a group having a C/I value greater than a preset threshold comprises:

selecting a subchannel having a high C/I value for the MSs belonging to a group having the C/I value greater than the threshold among the unallocated subchannels to allocate a subchannel to each MS; and repeatedly allocating subchannels until the minimum data rate for the corresponding MS is satisfied.

11. The apparatus of claim 8, wherein performing resource allocation for MSs belonging to the group having a C/I value below the threshold comprises:

defining a parameter $\alpha$ for a signal combining condition of an RS belonging to a corresponding group;

calculating the C/I value for available subchannel resources between all RSs and MSs belonging to the corresponding group as:

$$d_{k,s} = \frac{1}{N_s} \sum_{n=1}^{N} c_{k,n,s}(1 - [\rho_{n,s}])$$

where $N_s$ denotes a number of subchannels unallocated for each individual RS, an RS is defined as s (=1, 2, ..., S), a subchannel is defined as n (=1,2, ..., N), an MS is defined as k (=1,2, ..., K), $c_{k,n,s}$ is defined as a number of transmission bits satisfying a target Bit Error Rate (BER) taking into account a signal level for a subchannel #n that an MS #k has received from an RS #s, and $\rho{n,s}$ is defined as a parameter that has a value of k when an MS #k uses a subchannel #n of an RS #s, and otherwise, has a value of 0;

finding, by the BS, a combination of an RS having a highest C/I value and an MS;

checking a condition $\alpha \times C_{k',n',s_1} < C_{k',n',s_{1,2}}$ where $\alpha$ is defined as a parameter related to signal combining condition, an MS having a highest C/I value in a corresponding group is defined as k', an RS with a highest C/I value and an MS with a second highest C/I value are defined as $s_1$ and $s_2$, respectively, and a subchannel corresponding to a maximum value of transmittable bits among available subchannels n for k' and $s_1$ is defined as n' applying signal combining of the RS with the highest C/I value and the RS with the second highest C/I value, if the condition $\alpha \times C_{k',n',s_1} < C_{k',n',s_{1,2}}$ is satisfied;

allocating corresponding subchannel only for the RS with the highest C/I value if the condition $\alpha \times C_{k',n',s_1} < C_{k',n',s_{1,2}}$ is not satisfied; and allocating the subchannels until the minimum data rate of the corresponding MS is satisfied;

wherein the above steps are repeatedly performed for all MSs in the corresponding group.

12. The method of claim 4, wherein .alpha.=2.

13. The apparatus of claim 1, wherein .alpha.=2.

14. A method for resource allocation in a cellular communication system comprising:
- determining an average carrier-to-interference ratio (C/I) value from a plurality of signals received from mobile stations;
- allocating each of the plurality of mobile stations to a selected group, wherein allocation is based on said average carrier-to-interference ratio;
- allocating resources satisfying a minimum data rate from a group of mobile stations having a C/I value greater than a preset threshold;
- allocating resources by applying an optional signal combining scheme considering a combination of two remote stations having a highest C/I value for the mobile stations having a C/I value less than the preset threshold;
- the resource allocation comprising;
  - applying signal combining of the RS with the highest C/I value and the RS with the second highest C/I value, if $\alpha \times C_{k',n',s_1} < C_{k',n',s_{1,2}}$ is satisfied;
  - allocating corresponding subchannel only for the RS with the highest C/I value if $\alpha \times C_{k',n',s_1} < C_{k',n',s_{1,2}}$ is not satisfied, wherein
    - $\alpha$ is a parameter related to signal combining condition, an MS having a highest C/I value in a corresponding group is defined as k', an RS with a highest C/I value and an RS with a second highest C/I value are defined as $s_1$ and $s_2$, respectively,
    - $c_{k,n,s}$ is defined as a number of transmission bits satisfying a target Bit Error Rate (BER) taking into account a signal level for a subchannel #n that an MS #k has received from an RS #s, and
  - a subchannel corresponding to a maximum value of transmittable bits among available subchannels n for k' and $s_1$ is defined as n'; and
  - allocating remaining unallocated subchannels of each to mobile stations having a high C/I value among mobile stations.

15. The method of claim 14, wherein allocating the mobile stations into groups comprises:
- calculating an average transmission bit received from each mobile station;
- finding a mobile stations having a maximum value among the calculated average transmission, and
- comparing the average transmission bit corresponding to the mobile station having the maximum value with a threshold.

16. The method of claim 14, wherein performing resource allocation satisfying a minimum data for mobile stations belonging to a group having a C/I value greater than a preset threshold comprises:
- selecting a subchannel having a high C/I value for the mobile stations belonging to a group having the C/I value greater than the threshold among the unallocated subchannels to allocate a subchannel to each mobile station; and
- allocating subchannels until the minimum data rate for the corresponding mobile station is satisfied.

17. An apparatus for resource allocation in a cellular communication system comprising:
- a processor in communication with a memory, the memory including code which provides instruction to the processor to cause the processor to execute:
  - determining an average carrier-to-interference ratio (C/I) value from a plurality of signals received from mobile stations;
  - allocating each of the plurality of mobile stations to a selected group, wherein allocation is based on said average C/I value;
  - allocating resources satisfying a minimum data rate from a group of mobile stations having a C/I value greater than a preset threshold;
  - allocating resources by applying an optional signal combining scheme considering a combination of two remote stations having a highest C/I value for the mobile stations having a C/I value less than the preset threshold;
  - the resource allocation comprising;
    - applying signal combining of the RS with the highest C/I value and the RS with the second highest C/I value, if $\alpha \times C_{k',n',s_1} < C_{k',n',s_{1,2}}$ is satisfied;
    - allocating corresponding subchannel only for the RS with the highest C/I value if $\alpha \times C_{k',n',s_1} < C_{k',n',s_{1,2}}$ is not satisfied, wherein
      - $\alpha$ is a parameter related to signal combining condition, an MS having a highest C/I value in a corresponding group is defined as k', an RS with a highest C/I value and an RS with a second highest C/I value are defined $s_1$ and $s_2$, respectively,
      - $c_{k,n,s}$ is defined as a number of transmission bits satisfying a target Bit Error Rate (BER) taking into account a signal level for a subchannel #n that an MS #k has received from an RS #s, and
    - a subchannel corresponding to a maximum value of transmittable bits among available subchannels n for k' and $s_1$ is defined as n'; and
    - allocating remaining unallocated subchannels of each to mobile stations having a high C/I value among mobile stations.

18. The apparatus of claim 17, wherein allocating the mobile stations into groups comprises:
- calculating an average transmission bit received from each mobile station;
- finding a mobile stations having a maximum value among the calculated average transmission, and
- comparing the average transmission bit corresponding to the mobile station having the maximum value with a threshold.

19. The apparatus of claim 17, wherein performing resource allocation satisfying a minimum data rate for mobile stations belonging to a group having a C/I value greater than a preset threshold comprises:
- selecting a subchannel having a high C/I value for the mobile stations belonging to a group having the C/I value greater than the threshold among the unallocated subchannels to allocate a subchannel to each mobile station; and
- allocating subchannels until a minimum data rate for the corresponding mobile station is satisfied.

* * * * *

UNITED STATES PATENT AND TRADEMARK OFFICE
CERTIFICATE OF CORRECTION

| | | |
|---|---|---|
| PATENT NO. | : 8,134,945 B2 | Page 1 of 1 |
| APPLICATION NO. | : 11/965804 | |
| DATED | : March 13, 2012 | |
| INVENTOR(S) | : Byung-Jik Kim et al. | |

It is certified that error appears in the above-identified patent and that said Letters Patent is hereby corrected as shown below:

Column 13, Claim 8, Line 53 should read as follows
--...respectively, and a subchannel...--

Signed and Sealed this
Thirty-first Day of July, 2012

David J. Kappos
*Director of the United States Patent and Trademark Office*